US009624875B2

(12) United States Patent
Pifer et al.

(10) Patent No.: US 9,624,875 B2
(45) Date of Patent: Apr. 18, 2017

(54) ISOLATION VALVE WITH INTEGRATED FLOAT VALVE FOR HIGH-PRESSURE APPLICATIONS

(75) Inventors: Daniel Lee Pifer, Chelsea, MI (US); Vaughn K. Mills, Chelsea, MI (US)

(73) Assignee: Eaton Corporation, Cleveland, OH (US)

(*) Notice: Subject to any disclaimer, the term of this patent is extended or adjusted under 35 U.S.C. 154(b) by 256 days.

(21) Appl. No.: 13/980,434

(22) PCT Filed: Jan. 19, 2012

(86) PCT No.: PCT/US2012/021848
§ 371 (c)(1),
(2), (4) Date: Jul. 18, 2013

(87) PCT Pub. No.: WO2012/100039
PCT Pub. Date: Jul. 26, 2012

(65) Prior Publication Data
US 2013/0298880 A1   Nov. 14, 2013

Related U.S. Application Data

(60) Provisional application No. 61/435,096, filed on Jan. 21, 2011.

(51) Int. Cl.
*F02M 25/08*  (2006.01)
*F16K 31/06*  (2006.01)
*B60K 15/035*  (2006.01)

(52) U.S. Cl.
CPC ........ *F02M 25/08* (2013.01); *F02M 25/0836* (2013.01); *F02M 25/0872* (2013.01); *F16K 31/06* (2013.01); *B60K 15/03519* (2013.01)

(58) Field of Classification Search
CPC .. F02M 25/0836; F02M 37/20; F02M 57/027; F02M 61/08; F02M 2025/0845; F02M 59/366; F16K 31/06

(Continued)

(56) References Cited

U.S. PATENT DOCUMENTS 4,700,682 A * 10/1987 Ota .................... F02M 25/0836
                                                    123/516
5,012,838 A    5/1991 Kawase et al.
(Continued)

FOREIGN PATENT DOCUMENTS

DE    4344837 A1    7/1994
DE    10227524 A1   1/2004
(Continued)

OTHER PUBLICATIONS

European Patent Office: International Search Report and Written Opinion Issued in corresponding International Application No. PCT/US2012/021848, Date of Mailing: Apr. 24, 2012.

*Primary Examiner* — Long T Tran
(74) *Attorney, Agent, or Firm* — Fishman Stewart PLLC

(57) ABSTRACT

A valve assembly for a high-pressure fluid reservoir includes an isolation valve having a selectively energizable coil, an armature that is moveable between a first position when the coil is energized and a second position when the coil is de-energized, and an isolation valve seal coupled to the armature. The assembly also includes a float valve having a float with a passage at a bottom portion and an orifice at a top portion of the float, wherein the isolation valve seal is aligned to open and close the passage and wherein vapor flows through the passage and the orifice when the coil is energized during a high pressure condition. A housing houses both the isolation valve and the float valve and has a port that is opened and closed by the float valve.

20 Claims, 6 Drawing Sheets

(58) Field of Classification Search
USPC .................. 123/520, 519, 188.1, 188.17; 251/129.15, 129.02; 137/202, 192, 15.26
See application file for complete search history.

(56) References Cited

U.S. PATENT DOCUMENTS

| | | | | |
|---|---|---|---|---|
| 5,605,177 | A * | 2/1997 | Ohashi | B60K 15/03519 123/516 |
| 6,062,536 | A * | 5/2000 | Bircann | F16K 31/0658 251/129.15 |
| 6,162,536 | A * | 12/2000 | Montsinger | B29B 9/14 264/171.13 |
| 6,450,152 | B1 * | 9/2002 | Everingham | F02M 25/0836 123/516 |
| 7,044,111 | B2 * | 5/2006 | Cook | F02M 25/0836 123/458 |
| 7,117,895 | B2 * | 10/2006 | Koyama | F16K 11/105 137/881 |
| 7,147,017 | B2 * | 12/2006 | Leonhardt | F16K 24/044 137/202 |
| 7,347,191 | B2 * | 3/2008 | Atwood | B60K 15/035 123/516 |
| 8,001,991 | B2 * | 8/2011 | Theissler | B60K 15/03519 137/202 |
| 2007/0000542 | A1 * | 1/2007 | Johansen | F16K 24/044 137/202 |
| 2008/0092962 | A1 * | 4/2008 | Theissler | B60K 15/03519 137/587 |
| 2009/0056680 | A1 * | 3/2009 | Hill | B60K 15/035 123/520 |
| 2009/0211649 | A1 * | 8/2009 | Miura | B60K 15/035 137/202 |
| 2010/0224262 | A1 * | 9/2010 | Arnalsteen | B60K 15/03519 137/43 |
| 2011/0017320 | A1 * | 1/2011 | Kito | F16K 24/044 137/423 |
| 2011/0240145 | A1 * | 10/2011 | Pifer | F02M 25/0836 137/487.5 |

FOREIGN PATENT DOCUMENTS

| | | |
|---|---|---|
| FR | 2896568 | 7/2007 |
| GB | 2230767 A | 10/1990 |

* cited by examiner

ISOLATION VALVE WITH INTEGRATED FLOAT VALVE FOR HIGH-PRESSURE APPLICATIONS

CROSS-REFERENCE TO RELATED APPLICATION

This application is a national stage filing based upon International PCT Application No. PCT/US2012/021848, with an international filing date of Jan. 19, 2012, which claims the benefit of the filing date of U.S. Provisional Patent Application Ser. No. 61/435,096, filed Jan. 21, 2011, the entire disclosures of which are incorporated herein by reference.

TECHNICAL FIELD

The present teachings relate to a valve assembly for controlling fluid flow to and from a high-pressure fuel tank, and more particularly to such a valve assembly that also has a float valve integrated into the assembly.

BACKGROUND

High-pressure fluid reservoirs, such as high-pressure fuel tanks, may use an isolation valve to open and close a vapor path between the fuel tank and a purge canister. In a typical evaporative emissions system, vented vapors from the fuel system are sent to a purge canister containing activated charcoal, which adsorbs fuel vapors. During certain engine operational modes, with the help of specifically designed control valves, the fuel vapors are adsorbed within the canister. Subsequently, during other engine operational modes, and with the help of additional control valves, fresh air is drawn through the canister, pulling the fuel vapor into the engine where it is burned.

For high-pressure fuel tank systems, an isolation valve may be used to isolate fuel tank emissions and prevent them from overloading the canister and vapor lines. The isolation valve itself may be a normally-closed, solenoid-operated valve that is opened to allow vapor to flow out of the tank for depressurization or any other event requiring a controlled vapor release.

Emissions systems may also include a fuel limit vent valve (FLVV) that vents the fuel tank during refueling until the tank is filled to a desired. When the tank is full, the FLVV closes, creating a pressure drop in a filler tube to initiate shutoff of a filler nozzle. The isolation valve may work in conjunction with the FLVV by limiting vapor flow rate to a level less than the maximum flow rate that the FLVV can handle. This prevents rushing fuel vapors from "corking" the FLVV to a closed position. The control provided by the isolation valve may also prevent corking of other vent valves (e.g., an over-pressure relief valve and/or a vacuum relief valve) in the emissions system.

The isolation valve and the FLVV, along with other vent valves, may be arranged in series with each other. However, there is a desire for a valve assembly that combines the isolation valve function with a venting function to provide a more efficient, compact assembly.

SUMMARY

A valve assembly for a high-pressure fluid reservoir according to one aspect of the present teachings comprises an isolation valve having a selectively energizable coil, an armature that is moveable between a first position when the coil is energized and a second position when the coil is de-energized, and an isolation valve seal coupled to the armature. The assembly also includes a float valve having a float with a passage at a bottom portion and an orifice at a top portion of the float, wherein the isolation valve seal is aligned to open and close the passage and wherein vapor flows through the passage and the orifice when the coil is energized during a high pressure condition. A housing houses both the isolation valve and the float valve and has a port that is opened and closed by the float valve.

DETAILED DESCRIPTION

Figure 1:
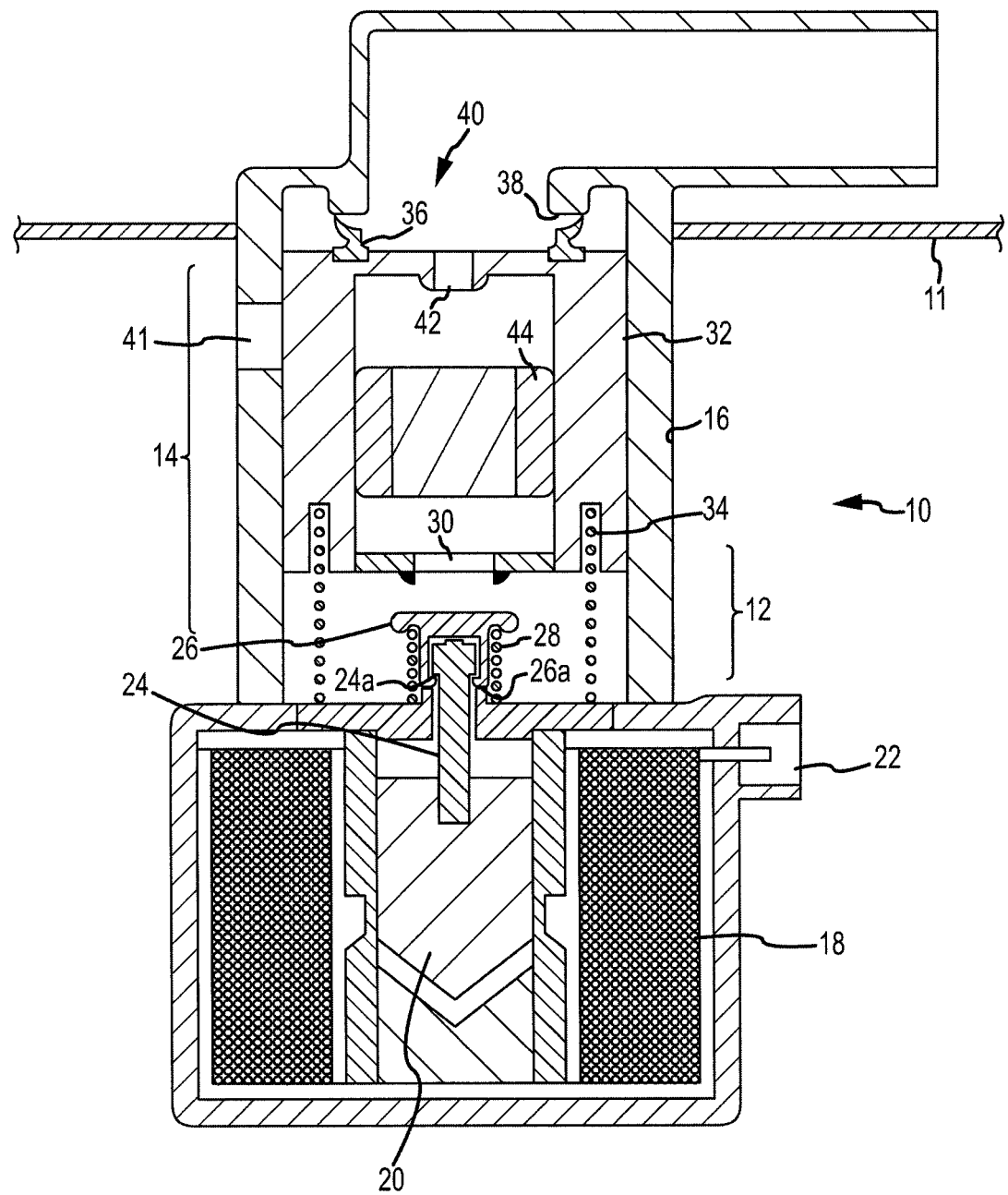
FIG. 1 illustrates a valve assembly according one aspect of the teachings during a high-pressure control condition where a coil in a solenoid valve is energized to open an isolation valve and where a float valve is closed.

FIG. 1 is a cross-sectional view of an integrated valve assembly 10 for a high-pressure fluid reservoir, such as a fuel tank 11, according to one aspect of the present teachings during a high-pressure control condition. The valve assembly 10 can include an isolation valve 12 and a float-operated vent valve 14, such as a fuel limit vapor valve (FLVV). For illustrative purposes only, the float valve 14 in FIGS. 1 through 6 is an FLVV, but those of ordinary skill in the art will understand that the float valve 14 can be another type of valve and/or have a different function without departing from the scope of the teachings. In this aspect, the isolation valve 12 is disposed beneath the FLVV 14. However, as shown in FIG. 5, the isolation valve 12 may be disposed above the FLVV 14 as well. The isolation valve 12 and the FLVV 14 may be disposed together in a housing 16 to form an integrated unit.

The isolation valve 12 can be a solenoid-operated valve having a coil 18 and an armature 20 that actuates based on the energized or de-energized state of the coil 18. Electrical terminals 22 link the coil 18 to a controller (not shown) that controls the electrical signals sent to the coil 18. The armature 20 may include a narrower piston portion 24. An isolation valve seal 26 is attached to the piston portion 24 and may be biased toward to a closed position by an armature spring 28 to close a passage 30.

Although the isolation valve seal 26 may be attached to the armature 20 by being formed as an integral part thereof, the isolation valve seal 26 may also be formed as a separate component. In the teachings shown in FIGS. 1 through 6, the isolation valve seal 26 can be separate and independent from the armature 20 and can be attached to the piston portion 24 via an engagement structure 26a, such as a hook or catch, that engages with a corresponding engagement structure 24a, such as a ledge, on the piston portion 24.

In certain aspects of the teachings, the armature spring 28 may bias the isolation valve seal 26 by engaging a flange on the seal 26. Note that the armature spring 28 in this aspect does not touch the armature 20 or piston portion 24 itself. This allows the isolation valve seal 26 to be decoupled from the armature 20 and not be affected by friction between the armature 20 and other components within the isolation valve 12 (e.g., the piston portion 24) that may cause response delays or hysteresis. Moreover, biasing the isolation valve seal 26 alone ensures that the passage 30 is securely closed even if the armature 20 itself is not in a fully sealing position. In other words, the decoupled isolation valve seal 26 does not depend on perfect operation of the armature 20 to reliably open and close the isolation valve 12.

The float valve 14 may include a float 32 that may be biased by a float spring 34 toward a closed position. The float 32 itself may have a seal 36 that contacts a seat 38 to restrict vapor access to a port 40 that links the valve assembly 10 with another component in the emissions system, such as a canister (not shown). The housing 16 may include one or more spillover windows 41, which allow fuel to enter the float valve 14 and lift the float 32 quickly once fuel reaches the edge of the window 41. Vapor may also flow from the tank 11 through the window 41 into the valve assembly 20 during operation of the isolation valve 12, which will be explained in greater detail below.

In one aspect of the teachings, the float 32 can be hollow and the passage 30 opened and closed by the isolation valve 12 is disposed at the bottom of the float 32. The hollow float structure allows vapor to flow through the float 32 as well as around it when the isolation valve 12 is open. A float orifice 42 at the top of the float 32 can act as a flow restrictor to provide controlled vapor flow from the valve assembly 10 into the port 40 to prevent corking of other valves in the emissions system. In one aspect, the float valve 14 can close the port 40 when a fuel level in the tank 11 reaches a predetermined level or when the vapor pressure within the valve assembly 10, combined with the biasing force of the float spring 34, is high enough to overcome the weight of the float 32 and push it upward against the float seal 36. Note that when the float 32 is in the closed position, vapor can still flow through the float orifice 42 to relieve pressure in the fuel tank 11.

In one aspect, the float valve 14 may also include an optional liquid/vapor discriminator 44 that closes the float orifice 42. The discriminator 44 blocks liquid fuel from entering the port 40.

The operation of the valve assembly 10 will now be explained. FIG. 1 shows the valve assembly 10 during a high tank pressure condition where controlled release of the tank pressure is desired. The controller (not shown) sends an electrical signal through the terminals 22 to energize the coil 18. The resulting magnetic field can pull the armature 20 into the isolation valve 12 (downward in the illustration shown in FIG. 1) against the biasing force of the armature spring 28, drawing the piston portion 24 and its attached isolation valve seal 26 away from the passage 30, allowing vapor to flow through the float 32.

At this stage, pressurized vapor in the tank 11 can flow through the spillover window 41 into the valve assembly 10. At this stage, the combined forces from the float spring 34 and the vapor pressure within the valve assembly 10 may be high enough to push the float 32 upward so that the float seal 36 presses against the port seat 38. At this point, a controlled amount of vapor may flow out of the tank 11 into the port 40 through the float orifice 42, allowing the tank 11 to depressurize while keeping the vapor flow rate below a maximum flow rate to prevent corking of other valves in the emissions system and allow continued venting.

Figure 2:
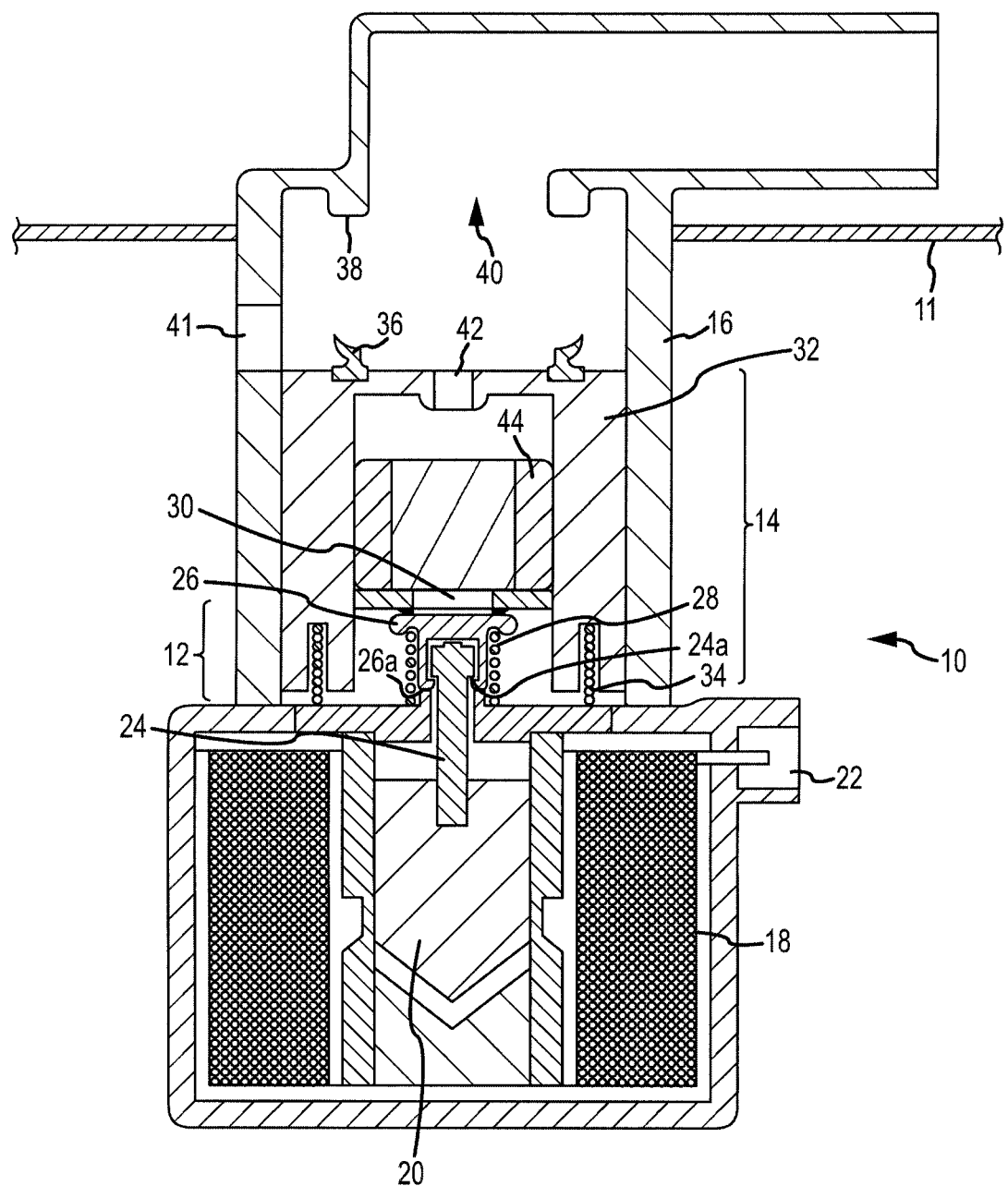
FIG. 2 is a cross-sectional view of the valve assembly shown in FIG. 1 during the high-pressure control condition where the coil is energized and both the isolation valve and the float valve are open.

FIG. 2 is a cross-sectional view of the valve assembly 10 shown in FIG. 1 after tank depressurization has taken place. This may occur after, for example, the tank pressure is low enough to allow greater vapor flow without corking or prior to a refueling operation. At this stage, the coil 18 is still energized, keeping the armature 20 retracted in the isolation valve 12 and the piston portion 24 in the open position. However, since the vapor pressure in the tank 11, and therefore the valve assembly 10, is lower, there is less pressure holding the float 32. The weight of the float 32 can overcome the biasing force of the float spring 34 as well as the lower vapor pressure in the assembly 10, allowing the float 32 to drop to an open position as shown in FIG. 2 and completely open the port 40. As a result, vapor can flow through the spillover window 41 directly into the port 40, bypassing the other components in the valve assembly 10.

Figure 3:
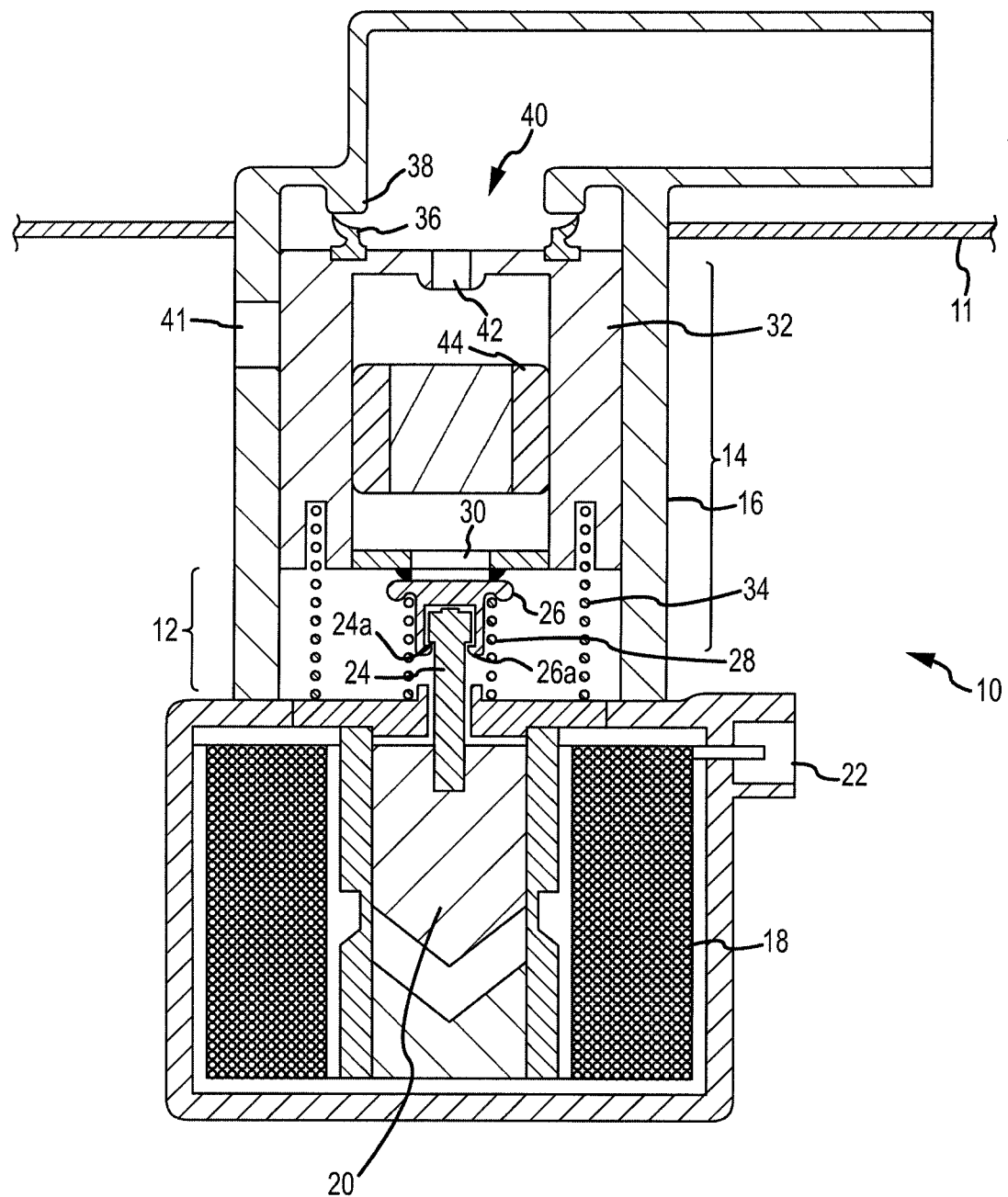
FIG. 3 is a cross-sectional view of the valve assembly shown in FIG. 1 during a refueling condition where the coil is de-energized, the isolation valve, and the float valve is movable between an open position and a closed position.

The integrated structure of the valve assembly 10 allows the same assembly 10 to handle venting during a refueling process as well as tank pressure control. FIG. 3 is a cross-sectional view of the valve assembly shown in FIG. 1 after refueling. At this stage, the coil 18 is still energized, with the armature 20 in the retracted position. Also, the isolation valve seal 26 rests against the passage 30 at the bottom of the float 32 and the float valve 14 is in an open position because the weight of the float 32 and the pressure drop across the float seal 36 overcome the biasing force of the float spring 34. Moreover, the fuel level in the tank is not high enough to fill the float valve 14 and lift the float 32. As a result, vapor flows freely through the port 42.

During refueling, vapor continues to flow freely through the port 42. When the fuel level in the tank 11 rises high enough to reach the edge of the spillover window 41, liquid fuel spills through the window 41 into the float valve 14. As a result, the float 32 can quickly rise until the float seal 36 reaches the port seat 38 to essentially close off the port 40. The resulting vapor drop in the rest of the emissions system may initiate shutoff of a refueling nozzle (not shown). If the valve assembly includes a liquid/vapor discriminator 44, the rising fuel level can cause the discriminator 44 to close the float orifice 42, sealing the port 40. Since the risk of undesirable liquid fuel entering the emissions system via the port 40 may be high when the tank is full, the discriminator 44 prevents even a small amount of liquid fuel from entering the port 40 by blocking the float orifice 42. However, the discriminator 44 is not required to create the pressure drop in the port 40 necessary to induce nozzle shutoff.

Figure 4:
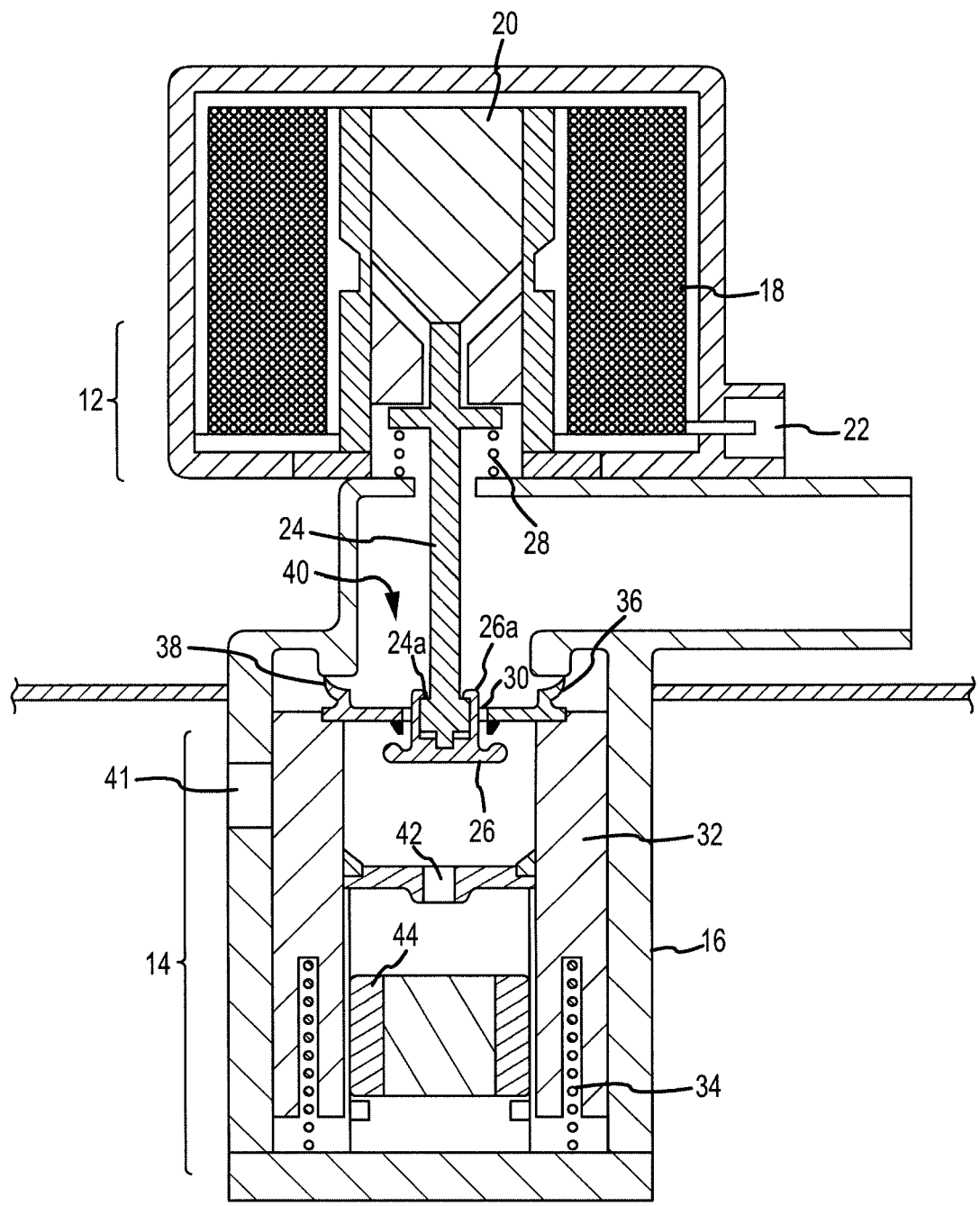
FIG. 4 illustrates a valve assembly according to another aspect of the teachings.
Figure 5:
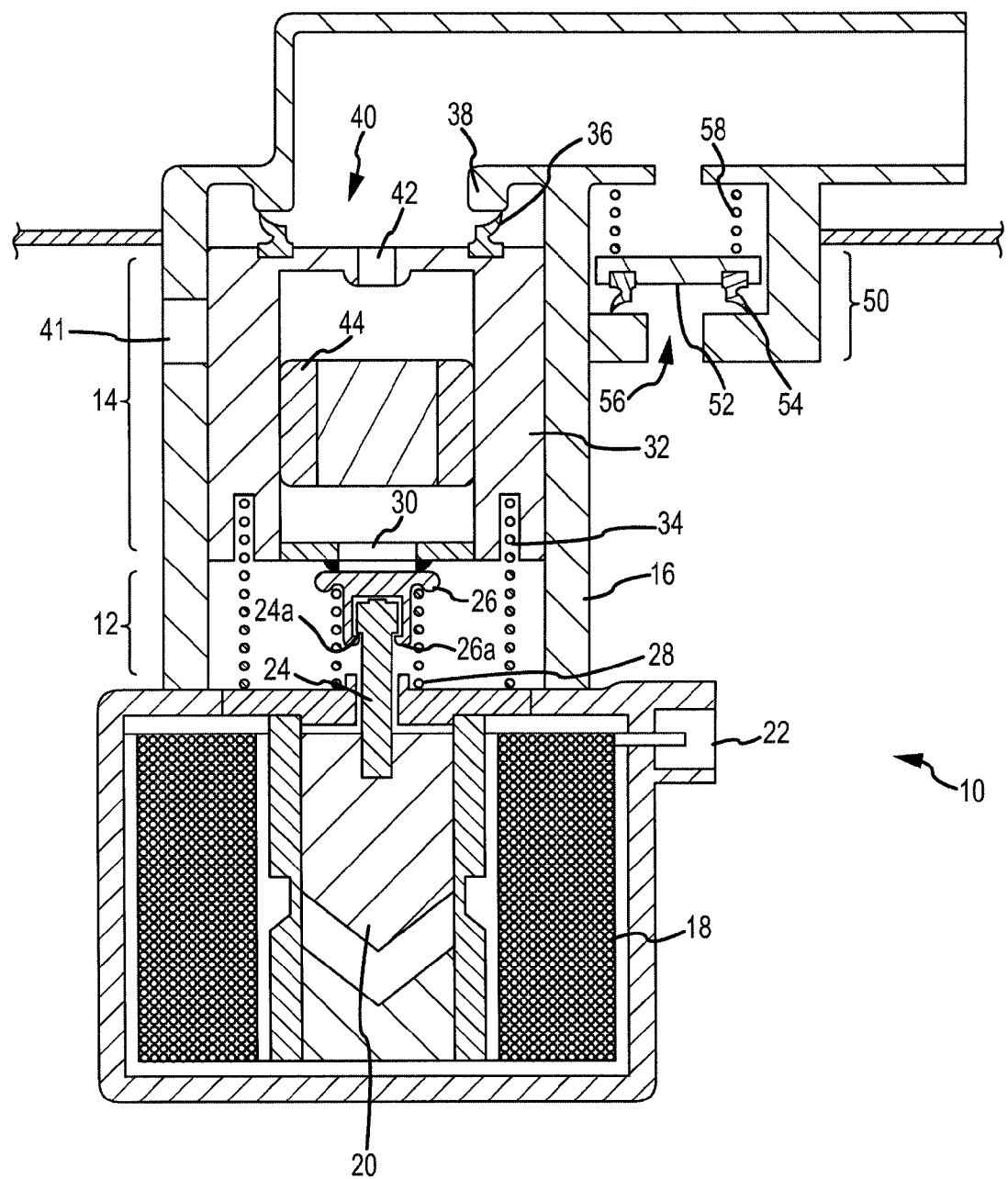
FIG. 5 illustrates a valve assembly integrating an over-pressure relief valve according to yet another aspect of the teachings.

Note that in an alternative aspect of the teachings as shown in FIG. 4, the isolation valve 12 can be disposed above the float valve 14 instead of below it. To accommodate this new orientation while maintain the same functionality, the piston portion 24 and isolation valve seal 26 may be disposed to hang inside float 32. When the coil 18 is de-energized, the isolation valve 12 can be biased to the closed position by the armature spring 28. In this aspect, the armature spring 28 can engage the piston portion 24 instead of the isolation valve seal 26, but the isolation valve seal 26 can still move independent of the piston portion 24. When the coil 18 is energized, the armature 20 and piston portion 24 may move downward, pushing the isolation valve seal 26 downward to the open position.

Figure 6:
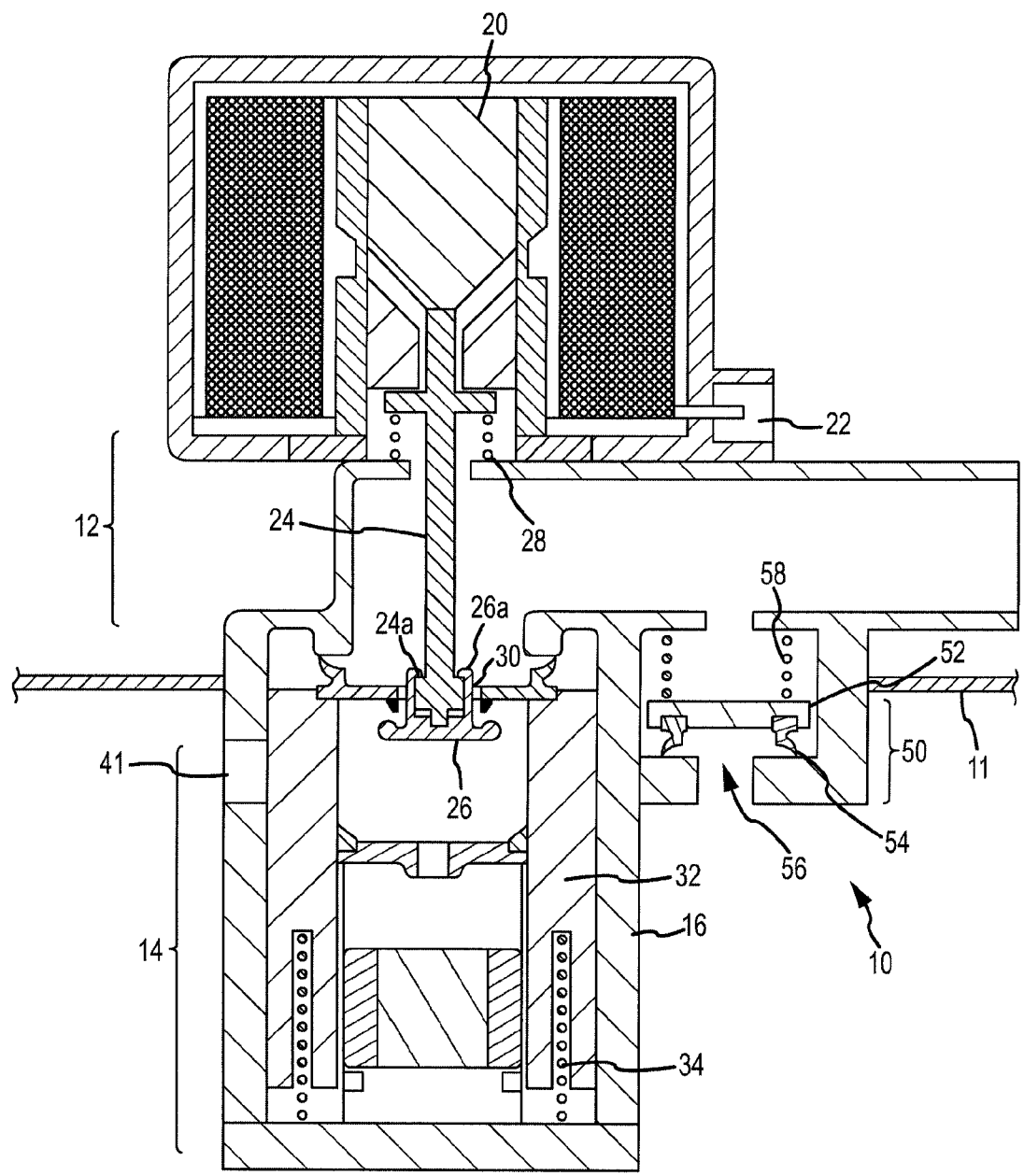
FIG. 6 illustrates a valve assembly integrating an over-pressure relief valve according to a further aspect of the teachings.

FIGS. 5 and 6 illustrate additional aspects of the present teachings. FIG. 5 illustrates an example of the valve assembly 10 in FIG. 1 with the addition of an integrated overpressure relief (OPR) valve 50, while FIG. 6 illustrates an example of the valve assembly in FIG. 4 with the integrated OPR valve 50. In both aspects, the OPR valve 50 can have a valve plate 52 and a seal 54 covering an OPR orifice 56. The valve plate 52 can be biased closed by a resilient member 58, such as a spring. The biasing force of the resilient member 58 may be selected so that the OPR valve 50 opens when the vapor pressure in the fuel tank 11 reaches above a selected level, thereby relieving excessive tank pressure.

Although the examples above focus on an isolation valve for a fuel tank, those of ordinary skill in the art will recognize that the valve assembly can be used in any application where controlled pressure release and valve shutoff are desired. Thus, the above description should not be read to be limited to fuel emissions systems.

It will be appreciated that the above teachings are merely exemplary in nature and is not intended to limit the present teachings, their application or uses. While specific examples have been described in the specification and illustrated in the drawings, it will be understood by those of ordinary skill in the art that various changes may be made and equivalents may be substituted for elements thereof without departing from the scope of the present teachings as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A valve assembly for a high-pressure fluid reservoir, comprising:
   an isolation valve having
      a coil that is selectively energizable,
      an armature that is moveable between a first position when the coil is energized and a second position when the coil is de-energized, and
      an isolation valve seal coupled to the armature;
   a float valve having a float with a passage at a bottom portion and an orifice at a top portion, wherein the passage and the orifice are in flow through communication,
   wherein the isolation valve seal is aligned to open and close the passage; and wherein vapor flows through the orifice when the isolation valve seal closes the passage, and through the passage and the orifice when the isolation valve seal opens the passage; and
   a housing that houses both the isolation valve and the float valve, the housing
   having a port that is opened and closed by the float valve.

2. The valve assembly of claim 1, wherein the coil is energized during a high pressure condition when controlled pressure release is desired.

3. The valve assembly of claim 1, wherein the isolation valve further comprises an armature spring that biases the armature to the second position, and wherein when the coil is energized, the armature overcomes a biasing force of the armature spring when moving to the first position.

4. The valve assembly of claim 1, wherein the first position is a retracted position and the second position is an extended position.

5. The valve assembly of claim 1, wherein the isolation valve seal closes the passage when the armature is in the first position.

6. The valve assembly of claim 1, wherein the isolation valve is disposed below the float valve, and wherein the armature pushes the float downward and the isolation valve seal closes the passage in the float when the coil is de-energized and the armature is in the second position.

7. The valve assembly of claim 1, wherein the isolation valve is disposed above the float valve, and wherein the armature pulls the float upward and the isolation valve seal closes the passage in the float when the coil is de-energized and the armature is in the second position.

8. The valve assembly of claim 1, wherein the isolation valve seal is a separate, independent component from the armature.

9. The valve assembly of claim 8, wherein the armature includes a narrower piston portion that couples the isolation valve seal with the armature.

10. The valve assembly of claim 8, wherein the isolation valve further comprises an armature spring that biases the isolation valve seal to the second position without contacting the armature itself, wherein when the coil is energized, the armature overcomes a biasing force of the armature spring when moving to the first position.

11. The valve assembly of claim 9, wherein the isolation valve seal and the piston portion each have an engagement structure that engages the isolation valve seal with the piston portion.

12. The valve assembly of claim 1, further comprising a spillover window disposed in the housing near the isolation valve.

13. The valve assembly of claim 1, further comprising a liquid/vapor discriminator disposed in the float valve, wherein the discriminator is aligned to open and close the orifice.

14. The valve assembly of claim 13, wherein the float is hollow, and wherein the liquid/vapor discriminator is disposed inside the float.

15. The valve assembly of claim 1, further comprising an over-pressure relief valve.

16. The valve assembly of claim 15, wherein the over-pressure relief valve is disposed in the housing.

17. The valve assembly of claim 15, wherein the housing includes an over-pressure orifice and the over-pressure relief valve includes:
   a valve plate;
   a seal disposed on the valve plate; and
   a resilient member that biases the valve plate to close the over-pressure orifice.

18. A valve assembly for a high-pressure fluid reservoir, comprising:
   a float valve having a float with a passage at a bottom portion and an orifice at a top portion, wherein the passage and the orifice are in flow through communication;
   an isolation valve having an isolation valve seal coupled to an armature, the isolation valve seal being configured to open and close the passage in response to a coil being one of energized or de-energized, wherein the armature includes a narrower piston portion that couples the isolation valve seal with the armature, and wherein vapor flows through the orifice when the isolation valve seal closes the passage, and through the passage and the orifice when the isolation valve seal opens the passage; and a housing that houses both the isolation valve and the float valve, the housing having a port that is opened and closed by the float valve.

19. The valve assembly of claim 18, wherein the isolation valve is disposed below the float valve, and wherein the armature pushes the float downward and the isolation valve seal closes the passage in the float when the coil is de-energized and the armature is in a second position.

20. The valve assembly of claim 18, wherein the isolation valve is disposed above the float valve, and wherein the armature pulls the float upward and the isolation valve seal closes the passage in the float when the coil is de-energized and the armature is in a second position.

* * * * *